United States Patent
Smirl et al.

[15] 3,690,736
[45] Sept. 12, 1972

[54] FLUID PRESSURE MODULATING APPARATUS

[72] Inventors: Richard L. Smirl, 314 N. Edgewood, La Grange Park, Ill. 60525; Richard D. Kerestury, 617 N. Garfield St., Lombard, Ill. 60148

[22] Filed: Oct. 5, 1970

[21] Appl. No.: 78,272

Related U.S. Application Data

[63] Continuation of Ser. No. 762,381, Sept. 25, 1968, abandoned.

[52] U.S. Cl. ................... 303/21 F, 137/529, 138/31, 188/181 A, 303/61
[51] Int. Cl. ............................................. B60t 8/00
[58] Field of Search .138/30, 31; 188/181 A; 185/37; 137/529; 303/21, 61–63, 68–69

[56] References Cited

UNITED STATES PATENTS 3,486,800  12/1969  Ayers ........................ 303/21
3,231,315  1/1966  Turnbull ..................... 303/61

Primary Examiner—Milton Buchler
Assistant Examiner—John J. McLaughlin
Attorney—Donald W. Banner, Lyle S. Motley, C. G. Stallings and William S. McCurry

[57] ABSTRACT

Fluid pressure regulating apparatus for incorporation in a hydraulic braking system of a vehicle, includes an electrically actuated spring driven reciprocable plunger device providing periodic increase and decrease of the available volume in the system for varying the braking pressure and therefore the braking force exerted by the system. Plunger movement is controlled by the combination of fluid pressure in the system, a spring having a negative deflection rate, and an armature moveable in accordance with a magnetic flux field. The spring and armature cooperate in providing rapid movement of the plunger in a direction to quickly reduce braking pressure for avoiding skidding.

1 Claim, 3 Drawing Figures

Patented Sept. 12, 1972

INVENTORS
RICHARD L. SMIRL
RICHARD D. KERESTURY

BY Herman E. Smith

ATTORNEY

INVENTORS.
RICHARD L. SMIRL
RICHARD D. KERESTURY
BY Herman E. Smith
ATTORNEY.

FLUID PRESSURE MODULATING APPARATUS

This application is a continuation of application ser. No. 762,381 filed Sept. 25, 1968, now abandoned.

SUMMARY OF THE INVENTION

The present invention relates generally to fluid pressure regulating apparatus and more particularly to apparatus for cyclically lowering and raising the pressure in a hydraulic brake system by periodically increasing and decreasing the available volume in the system.

Heretofore anti-skid brake systems have been provided in vehicles for avoiding uncontrollable skids resulting from a so-called locked wheel condition. It has been learned that a locked wheel condition results in less adhesion between the road surface and the wheel thereby reducing the effective retarding effort available for bringing the vehicle to a stop. In addition, a locked wheel is able to slide sideways as well as forwardly such that the path followed by the vehicle may be determined by random dynamic forces rather than the steering effort exerted by the vehicle operator.

It is an object of the present invention to provide improved anti-skid apparatus for a hydraulic braking system characterized in that periodic pressure changes in the system are initiated rapidly in order to avoid a locked wheel condition while maintaining highly effective braking. A further object is to provide electromechanical pressure modulating apparatus for initiating rapid pressure changes in a hydraulic brake system. Other objects and advantages of the invention will become apparent to those skilled in the art from consideration of the following description together with the drawing.

DESCRIPTION OF THE PREFERRED EMBODIMENT

Figure 1:
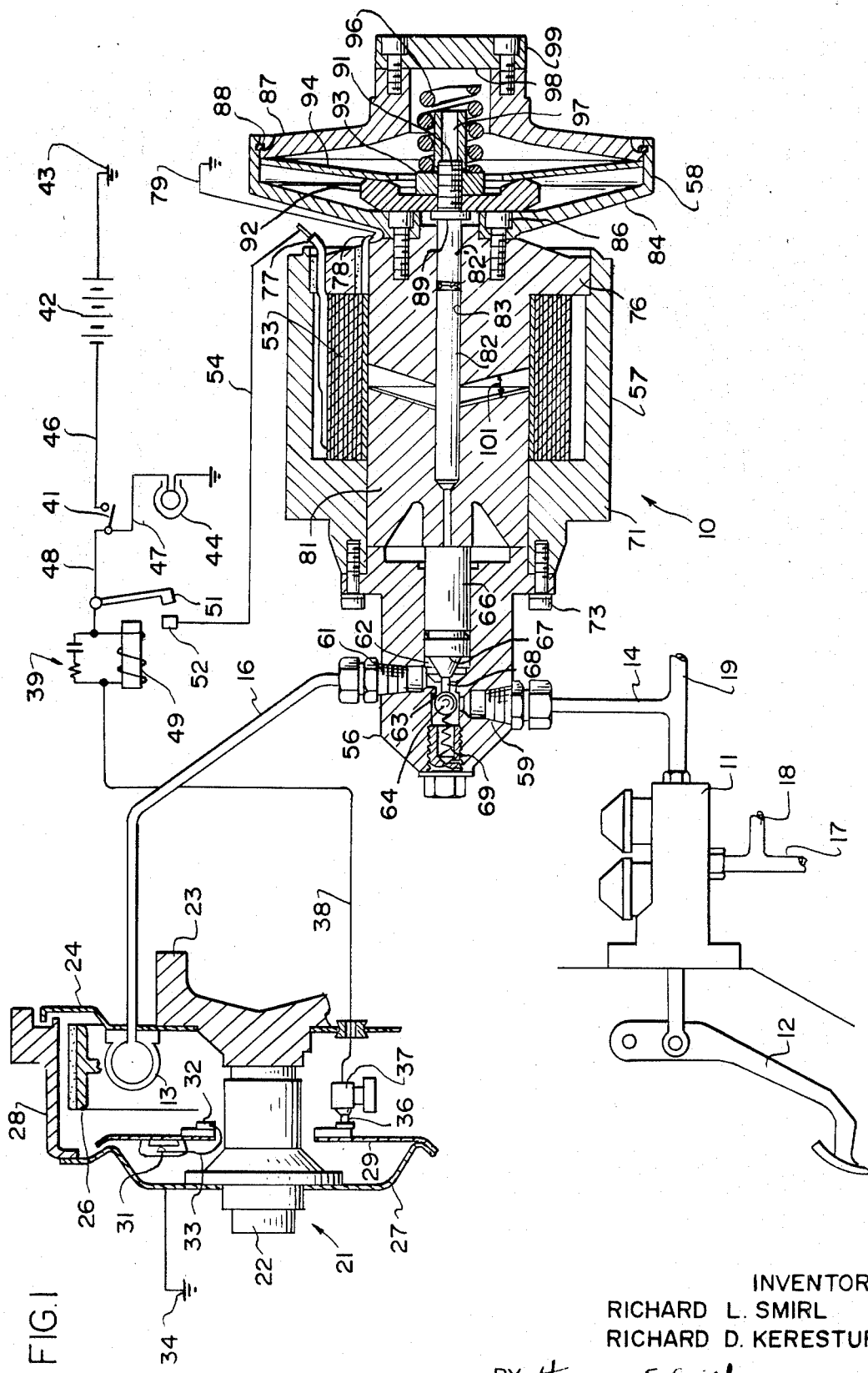
FIG. 1 illustrates the fluid pressure regulating apparatus of the present invention in cooperation with a hydraulic braking system.

The reference character 10 generally indicates a fluid pressure modulating apparatus connected to a hydraulic braking system and to an electrical control circuit. The hydraulic braking system includes a master cylinder 11, actuatable by means of foot pedal 12, for supplying fluid under pressure to brake cylinder 13 through conduits 14, 16. If desired master cylinder 12 may be a dual type, providing separate sources of pressure for one pair of wheels through the conduits 17, 18 and for another pair of wheels through the conduits 14, 19. For simplicity in illustration, the pressure modulating apparatus 10 is shown connected to the fluid circuit of one wheel 21, however in practice, it is contemplated that a transverse pair of wheels would be similarly treated, such as by providing an additional modulating apparatus in the conduit 19 or by connecting the modulating apparatus in a common conduit supplying a pair of wheels. It is desirable to provide individual pressure modulation for each wheel of the vehicle, however it has been found that considerable benefit is gained from providing pressure modulation for the rear pair of wheels in a four wheeled vehicle, inasmuch as directional stability can be assisted during panic stopping by allowing the rear wheels to roll.

Wheel 21 includes a hub member 22 rotatably mounted on non-rotatable support member 23. Backing plate 24 is secured to support member 23 and serves as a mounting means for brake cylinder 13 and brake shoes 26. An annular member 27, secured to hub 22, supports brake drum 28. A second annular member 29 is secured to annular member 27 serving to support an angular deceleration switch 31 and slip ring 32, which are electrically connected to each other by the conductor 33. The rotatable portions of the wheel assembly are connected to electrical ground as indicated schematically at 34, such that an electrical circuit from slip ring 32 is closed to ground when switch 31 is closed. Switch 31 is a normally open switch arranged to close when the rotational speed of wheel 21 is decreased at a rate beyond a preselected deceleration representing an impending locked wheel condition.

A brush 36 is maintained in contact with slip ring 32 and supported on the non-rotatable backing plate 24 by brush holder 37. Brush 36 is electrically connected to an electrical control circuit represented for purposes of illustration as conductor 38, relay 39, brake switch 41 and battery 42. Other suitable control arrangements may be employed as desired, the present control circuit being illustrative of one form of control circuit useful in employing the present invention. As illustrated, a source of electrical energy such as a battery 42 of a vehicle, is grounded as indicated at 43. Battery 42 is connected to indicator light 44 through the conductors 46, 47 and brake switch 41. Battery 42 is also connected to relay 39 through conductors 46, 48 and brake switch 41. When both brake switch 41 and deceleration switch 31 are closed, a circuit is completed through coil 49 of relay 39 which closes contacts 51, 52. When contacts 51, 52 are closed, a circuit is completed from battery 42 through conductor 54 to solenoid winding 53 of the pressure modulating apparatus 10.

Pressure modulating apparatus 10 includes a fluid transfer portion 56, an electric motor portion 57, and a spring motor portion 58. Fluid transfer portion 56 includes an inlet port 59, an outlet port 61, and an expansion chamber 62 in communication with each other. A valve seat 63 is disposed adjacent inlet port 59 for cooperation with a ball check valve 64. A displacable plunger 66, slidable in expansion chamber 62, has a face or wall portion 67 defining the effective volume of expansion chamber 62. A nose portion 68 extending from wall 67, normally engages ball check 64, maintaining the ball off the seat 63 against the bias of check valve spring 69. When plunger 66 is displaced from the above described normal position as a result of excess pressure or an impending skid signal, check valve spring 69 moves ball 64 against valve seat 63 isolating conduit 14 and master cylinder 11 from brake cylinder 13. However, brake cylinder 13 remains in communication with plunger 66 in expansion chamber 62. Movement of plunger 66 in chamber 62 determines the pressure available in the system for exerting braking force through brake shoes 26.

Electric motor portion 57 and spring motor portion 58 provide a reciprocable control device for controlling the position of plunger 66 in expansion chamber 62 thus defining the volume of expansion chamber 62. Electric motor portion 57 includes a housing 71 secured to fluid transfer portion 56 by means of cap screw 73. Solenoid winding 53 is arranged in housing 71 around stationary pole piece 76. A pair of leads 77, 78 extend from solenoid winding 53 for connection to conductor 54 and to electrical ground as indicated at 79. A moveable armature 81 is arranged to slide within housing 71 toward and from stationary pole piece 76. A push rod 82 entends rearwardly from armature 81 through a passage 83 in pole piece 76, into housing 84 of spring motor 58. Push rod 82 may be formed as two pieces 82, 82' in order to accommodate any out of square condition of fulcrum ring 92 without binding in passage 83.

Housing 84 of spring motor 58 is secured to electric motor portion 57 by means of cap screws 86. A reaction member 87, with end cap 99, is secured to housing 84 by a snap ring 88 forming an enclosure for the springs 94, 96. Push rod 82 includes a shoulder 89 adjacent threaded end portion 91 extending into the enclosure. An inner fulcrum ring 92 is secured against shoulder 89 by nut 93 on threaded portion 91. The outer perimeter of diaphragm spring 94 bears against reaction member 87. An inner portion of spring 94 bears against fulcrum ring 92, resiliently biasing push rod 82, armature 81 and plunger 66 in a direction defining minimum volume and maximum pressure in expansion or volumetric modifying chamber 62. A coil spring 96 encircles the extended portion 97 of push rod 82 and has one end engageable with the nut 93. The free length of coil spring 96 is less than the normal distance between nut 93 and the inner face 98 of end cap 99. Thus spring 96 does not become compressed until the gap closing stroke is nearly completed.

Figure 2:
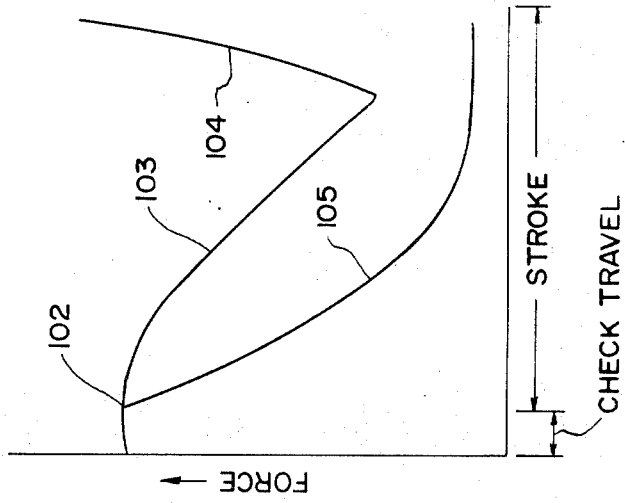
FIG. 2 is a diagram illustrating the relationship of biasing resistance and fluid force.

Referring now to FIG. 2, the forces exerted on plunger 66 during the gap closing stroke are shown in graphical form. The point 102 illustrates the condition when ball check 64 becomes seated in valve seat 63 isolating expansion chamber 62 from the fluid forces originating in the master cylinder. Curve portion 103 illustrates the decreasing biasing resistance provided by the negative deflection rate diaphragm 94 as plunger 66 is moved away from the minimum volume position. Curve portion 104 indicates the increasing biasing resistance provided by coil spring 96 near the end of the gap closing stroke.

Curve 105 illustrates the change in fluid force acting on the face 67 of plunger 66 as movement occurs away from the minimum volume position. The fluid force represented by curve 105 is also proportional to the braking force in brake cylinder 13. The fluid force represented by curve 105 is seen to be of less magnitude than the resisting force of springs 94, 96 represented by curve portions 103, 104 except at the point 102 when ball check 64 becomes seated.

Figure 3:
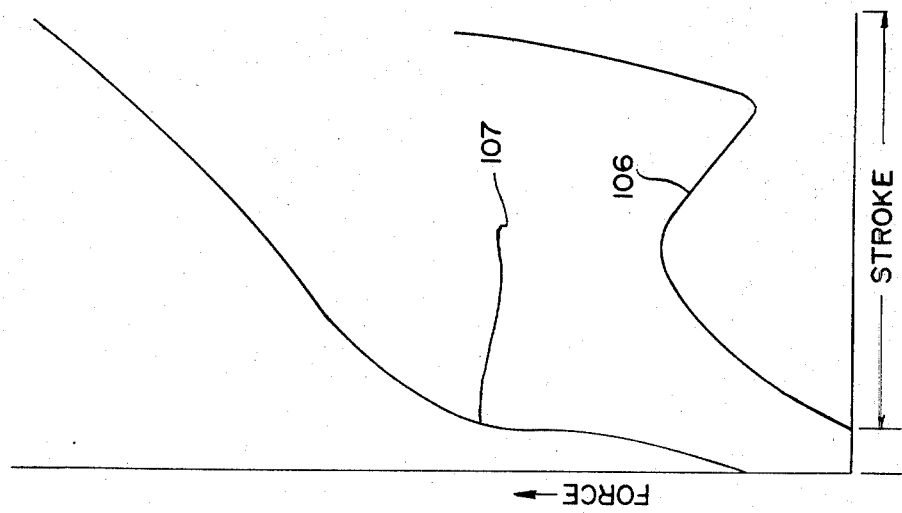
FIG. 3 is a diagram illustrating armature attracting and resisting forces.

Inasmuch as the fluid force and resisting force act in opposition to each other, the net affect on plunger 66 is represented by the algebraic summation of these forces as indicated by the curve 106 in FIG. 3. Inspection of curve 106 indicates that a net force exists tending to return the plunger 66 to the minimum volume and maximum pressure position. The line 107 indicates the increasing attracting force provided by movement of armature 81 toward pole piece 76 when solenoid 53 is energized. The attracting force represented by line 107 acts in opposition to the summation of the fluid and resisting forces represented by curve 106. Inasmuch as the attracting force as represented by 107 is in excess of the forces 106 when solenoid 53 is energized, movement of plunger 66 will occur away from the minimum volume position thereby decreasing the fluid pressure and braking force exerted through brake cylinder 13. In FIG. 3, the vertical distance between curves 106, 107 represents a net force available for accelerating movement of the armature in the gap closing direction.

OPERATION

As illustrated in the drawings, the pressure modulating apparatus, brake system and control circuit are shown in the normal or inactive positions. Considering first the operation of the braking system during a normal stop, the foot pedal 12 is depressed by the vehicle operator for expanding brake shoes 26 against brake drum 28. Fluid pressure developed in master cylinder 11 is communicated to brake cylinder 13 by means of the conduits 14, 16 and the ports 59, 61 in fluid transfer portion 56. The control circuit and fluid modulation apparatus remain inactive during a normal stop in which the deceleration of the vehicle is within a desired range avoiding a locked wheel condition.

When the braking effort applied to the wheel is greater than the tractive effort between the wheel and the road surface, the wheel will cease rotation resulting in a so-called locked wheel condition. This condition may result from lower than normal tire to road adhesion such as a slippery road surface, or from higher pressure resulting from excessive pedal effort. A locked wheel condition is to be avoided inasmuch as the coefficient of friction between tire and road decreases as a skid is approached thereby diminishing effective braking of the vehicle. A further disadvantage of the locked wheel condition is that excessive wear can occur in one spot on the tire which may result in a flat spot or blowout. Inasmuch as the tire can slide sideways as easily as forwardly during a locked wheel condition, while experiencing diminished road adhesion, the path followed by the vehicle is determined to a large extent by various dynamic forces beyond the control of the vehicle operator. Thus a locked wheel condition can result in less effective braking of the vehicle, loss of control of the direction followed by the vehicle, and the possibility of a blow-out. The approach of a locked wheel condition can be sensed before the wheel stops rotating by the deceleration switch 31.

When a locked wheel condition is developing, the control circuit is energized, inasmuch as both brake switch 41 and deceleration switch 31 are closed. When the control circuit is energized, contacts 51, 52 close, allowing current to flow from battery 42 through the solenoid winding 53 to ground as indicated at 79. Current flow through solenoid winding 53 generates a magnetic flux field acting on pole piece 76 and armature 81. Armature 81 is attracted toward pole piece 76 with a force which increases in magnitude as the gap 101 closes. This increasing magnitude of force results in accelerated motion of armature 81 in a direction away from plunger 66, allowing plunger 66 to move away from the minimum volume position shown in the drawing. Movement of plunger 66 away from the minimum volume position as a result of excess system pressure or movement of armature 81, allows ball check valve 64 to seat preventing the application of fluid pressure from master cylinder 11 and increasing the volume of expansion chamber 62 for decreasing the pressure exerted in brake cylinder 13.

Movement of armature 81 in the gap closing direction results in flexure of diaphragm spring 94 which has a negative spring rate, that is, the resistance offered by spring 94 diminishes as flexure occurs. Thus armature 81 is moved in a gap closing direction by a force of increasing magnitude against a resistance of decreasing magnitude both of which contribute to accelerated movement of the armature. This accelerated movement is particularly beneficial in permitting plunger 66 to move away from the minimum volume position. The pressure in brake cylinder 13 drops rapidly tending to free the wheel before it has reached the point of skidding. When the wheel is free, the deceleration switch 31 opens which in turn opens the contacts 51, 52 for deenergizing solenoid winding 53.

The auxiliary coil spring 96 is compressed near the end of the gap closing stroke, absorbing the kinetic energy of the accelerated armature. Spring 96 serves as a kick-off spring for initiating return movement of the armature and plunger toward the minimum volume position for again increasing the pressure in cylinder 13. This opposes a tendency for the armature to dwell in the closed gap position as a result of the decaying flux field, and serves to initiate movement of plunger 66 in a direction for restoring minimum volume conditions for rapidly reapplying the braking force.

Thus a fluid pressure modulating apparatus is provided which cyclically releases and reapplies the brakes for maintaining a high level of braking effort while avoiding a locked wheel condition. While the invention has been shown and described in terms of a preferred embodiment thereof, it will be apparent to those skilled in the art, that various changes and modifications may be made therein without departing from the invention.

What is claimed is:

1. Fluid pressure modulating apparatus for connection to a fluid circuit of a fluid pressure actuated braking system, said modulating apparatus including an expansion chamber communicable with said fluid circuit, having a displaceable wall member operatively associated therewith movable for varying the volume of said chamber; including a reciprocable control device having a drive member abuttable with said displaceable wall member for controlling movement thereof toward and from a position defining minimum volume in said chamber, said control device including motor means energizable in response to a preselected braking condition for moving said drive member in a first direction releasing said wall member for movement with respect to said chamber, resilient biasing means connected to said motor means yieldably opposing movement of said drive member in said first direction, said biasing means including a diaphragm spring having a negative deflection rate providing an opposing force of diminishing magnitude in response to movement of said drive member through a portion of its stroke in said first direction, and an energy absorbing device having a positive load-deflection rate arranged and disposed for engagement with said drive member during a terminal portion of drive member movement in said first direction for resiliently absorbing the kinetic energy thereof, said energy absorbing device providing means implementing return movement of said drive member upon deenergization of said motor means.

* * * * *